United States Patent [19]

Stockburger et al.

[11] Patent Number: 4,501,959
[45] Date of Patent: Feb. 26, 1985

[54] METHOD AND APPARATUS FOR ALIGNING FLAT DATA SUPPORTS

[76] Inventors: Hermann Stockburger, Kirnachweg 7, D-7742 St. Georgen; Hans-Georg Winderlich, Niedere Str. 36, D-7730 Villingen, both of Fed. Rep. of Germany

[21] Appl. No.: 540,821

[22] Filed: Oct. 11, 1983

Related U.S. Application Data

[63] Continuation of Ser. No. 247,167, Mar. 24, 1981.

[30] Foreign Application Priority Data

Mar. 24, 1980 [DE] Fed. Rep. of Germany ....... 3011318

[51] Int. Cl.³ ............... G06K 13/063; G06K 13/067
[52] U.S. Cl. .................. 235/485; 235/482; 235/483; 235/484; 235/486
[58] Field of Search ............... 235/482, 483, 484, 485, 235/486

[56] References Cited

U.S. PATENT DOCUMENTS 3,612,832 10/1971 Goldstein ..................... 235/485
4,036,430 7/1977 Eppich ........................ 235/485

Primary Examiner—Harold I. Pitts
Attorney, Agent, or Firm—Donald Brown

[57] ABSTRACT

The method of aligning generally flat data supports of flexible sheet material such as credit cards, identity cards, check cards and similar documents includes the steps of engaging at least one edge of the data support and exerting an alignment force thereon; prior to exerting the alignment force on the data support edge, an arching force is exerted substantially normally on at least one main surface of the data support to deform the latter into a generally arched state. Preferably, the data support is deformed into a shape having a generally waved cross-section in a direction perpendicular to the direction of the arching force. At the end of the alignment operation, the data support is restored into its flat shape by a pressure plate urging the data support against a flat supporting face of a receiving member.

3 Claims, 3 Drawing Figures

METHOD AND APPARATUS FOR ALIGNING FLAT DATA SUPPORTS

This is a continuation of Ser. No. 247,167, filed Mar. 24, 1981.

BACKGROUND OF THE INVENTION

This invention generally relates to the field of processing data supports such as credit cards, cheque cards, identity cards and similar documents, more particularly to a method of aligning generally flat data supports or cards, and to an apparatus for performing the method.

For processing data supports such as credit cards, cheque cards, identity cards and similar documents, automatic machines may be used into which the data supports or cards are introduced for detection of and/or recording information thereon. Prior to processing, the data supports have to be brought into a predetermined position and/or orientation, so that the information on the data support may be read from specific zones thereof or data to be recorded thereon may be recorded at the appropriate locations. To this end, the data supports may be aligned by a guiding rail extending along the travelling path of the data support and leading towards a supporting plane on which the data support is received for processing. Data supports such as identity cards or authorization cards, which are intended for multiple use, are susceptible of being damaged by repeated action of alignment forces on their edges, particularly in case of data supports having reduced rigidity or dimensional consistency.

The alignment provided by conventional processing systems is unsatisfactory, particularly in case of data supports having high flexibility.

OBJECTS OF THE INVENTION

A primary object of the invention is to provide an improved method of aligning generally flat flexible data supports, particularly of high flexibility or low rigidity.

A related object of the invention is to provide a method of aligning generally flat data supports of highly flexible material without damaging the same.

A further related object of the invention is to provide a method of precisely aligning generally flat flexible data supports even in case they are made of highly flexible material and even in case they show signs of wear by multiple use.

A further object of the invention is to provide an apparatus for performing the method.

SUMMARY OF THE INVENTION

In accordance with the invention, generally flat data supports of flexible material such as credit cards, identity cards, authorization cards, cheque cards, are engaged at two opposed edges by an alignment system, and prior to acting on the edges by exerting an alignment force thereon, the data supports are deformed into an arched state by exerting an arching force substantially normally on one main surface thereof so that the data supports will preferably have a generally waved shape in cross-section. When the data supports are properly aligned, they may be processed in any desired manner. After processing, the data supports may be restored into their generally flat state by releasing the arching force and urging a generally flat plate against one main face of the data support, the opposed main face being pushed against a flat supporting plate.

BRIEF DESCRIPTION OF THE DRAWINGS

Further objects and features of the invention will stand out from the following description of exemplary embodiments with reference to the drawings. In the drawings.

DESCRIPTION OF PREFERRED EMBODIMENTS

Figure 2:
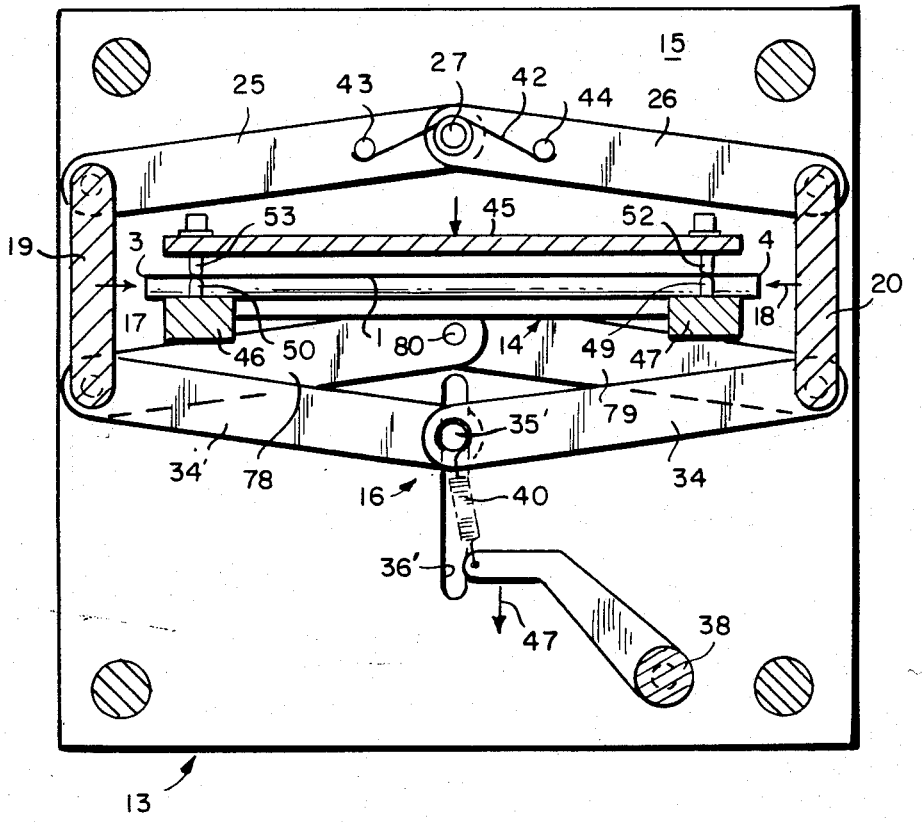
FIG. 2 is a cross-section along line III—III in FIG. 1.

The drawings show a station 13 into which a data support 1 may be introduced to be read or encoded for characterization and/or identification. The station 13 is provided with a supporting frame 14 forming a supporting surface of the data support and being stationary, e.g. by securing to a base frame 15. As best seen in FIG. 2, the supporting frame has smaller lateral outer dimensions than the data support 1 so that the two lateral edges 3, 4 of the data support will laterally project beyond the supporting frame.

The station 13 is provided with a system 16 for aligning the data support. This system comprises two side walls 19, 20 which may be reciprocated in the supporting plane of the supporting frame 14 in the direction of arrows 17, 18 and which expand perpendicularly to the moving direction. The side walls are connected on their respective front top ends to one end of scissors-type arms 23, 24 and 25, 26 through joints 21, 22, respectively. The scissors-type arms 23, 24 and 25, 26 are pivotably connected on their respective opposed ends to supporting bases 28, 29 rigidly secured on the frame, through joints 26', 27, respectively. On the lower ends of the front sides, the lateral walls 19, 20 are connected to third lever or scissors-type arms 78, 79 through corresponding joints 30, 31 respectively. The front and rear third scissors-type arms 78, 79 are pivotable connected on their respectively opposite end through a joint 80, to a supporting base 81 connected with the frame. On their bottom ends of the front sides, the side walls 19, 20 are connected to second scissors-type arms 32, 33 and 34, 34' through joints 30, 31, respectively. The lower scissors-type arm pairs 32, 33 and 34, 34' engaging on the front and rear faces, are pivotably supported, on their ends opposite the joints, on a pivot 35, 35' lying on a common rotating axis. The scissors-type arms are of equal length. The first and third scissors-type arms and the lateral walls together form a structure similar to a parallelogram. Each parallelogram extends perpendicularly to the base plane of the supporting frame 14. The joints 26', 80 and 27 are lying on a straight line extending perpendicularly to the base plane and extending through the track to be read.

The pivots 35, 35' may be reciprocated up and down within a guiding slot 36, 36'. The guiding slot extends along a line 37 which is orientated normally to the supporting surface of the supporting frame 14 and extends through the rotating centres of the joints 26 and 27.

Figure 1:
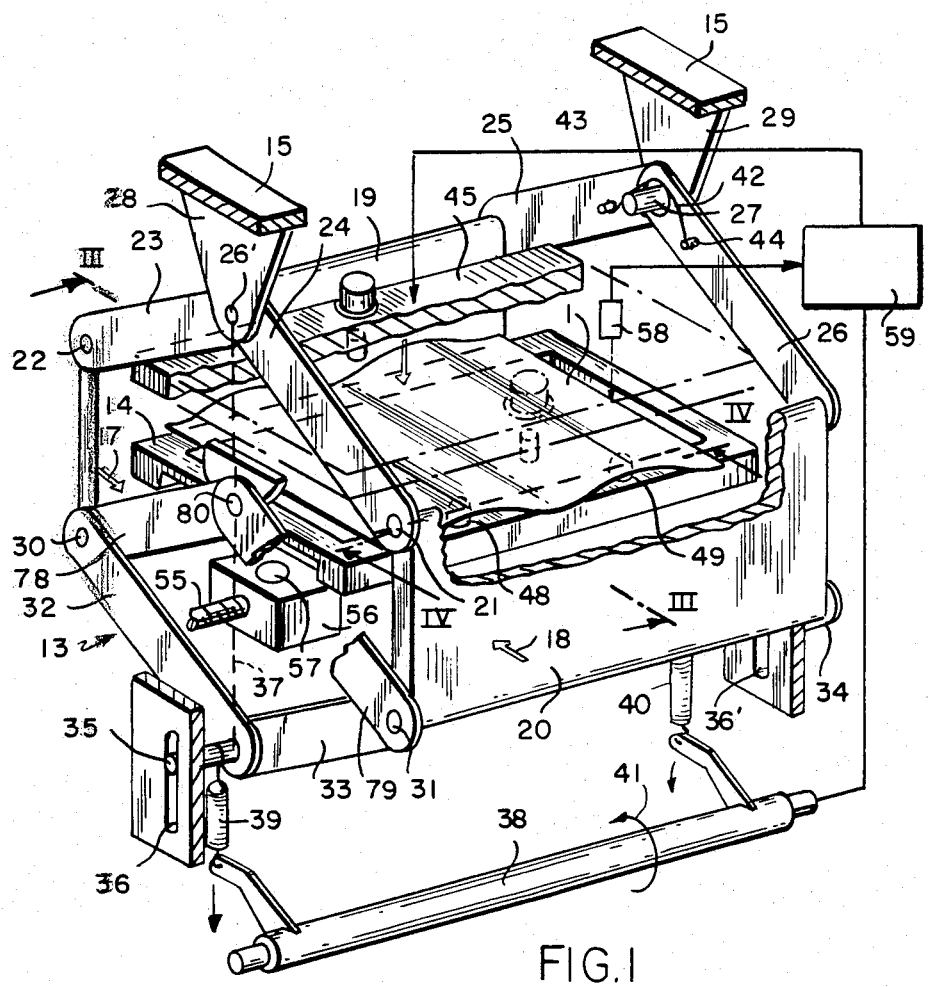
FIG. 1 is a perspective view of the device in partially broken-away representation.

An actuating shaft 38 supported on both of its ends in the base frame 15, engages the lower scissors-type pairs 32, 33 and 34, 34' through a pair of tensioning springs 39, 40, respectively. By rotating the actuating shaft in the direction of arrow 41, as seen in FIGS. 1 and 2, the pivots 35, 35' are moved down in the guiding slots 36, 36'. Further, pressure springs 42 are provided, having a top supporting location on the joints 26, 27 and engaging the scissors-type arms below supporting locations 43, 44, whereby the scissors-type arms are biassed into the starting position shown in FIGS. 1 and 2.

A pressure plate 45 which is movable perpendicularly with respect to the supporting plane of the supporting frame, is provided above the supporting frame 14.

On its two edges 46, 47 facing the side walls 19, 20 near the front and rear ends of the data support, the supporting frame has spaced pins 48, 49, 50. These are biassed into the positions shown projecting beyond the edges, by means of pressure springs 51, 51'. On each side of the pressure plate 45, substantially centrally in the respective pins 48, 49, pins 52, 53 are provided in the pressure plate which are biassed downwardly by pressure springs 54 in such a manner that they project from the pressure plate towards the edges 46, 47, as shown.

A sledge 56 having a sensor 57 is provided in a data detection system below the supporting frame 14 and may be driven e.g. by a spindle 55, the sledge being arranged in such a manner that the sensor 57 mounted thereon is moved along a path which is parallel to the supporting surface of the supporting frame 14 and simultaneously perpendicular to the moving direction of the side walls 19, 20, to extend at a predetermined distance from a centre line defined by the positions of the rotating axes of the joints 26, 35 and 27, 35.

Figure 3:
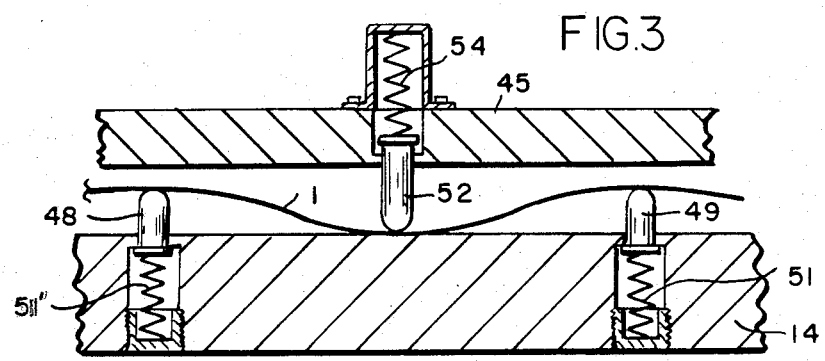
FIG. 3 shows a cross-section along line IV—IV in FIG. 1.

In operation, the data support 1 consisting of e.g. thin cardboard or paper is engaged and pulled into the station into a location between the supporting frame 14 and the pressure plate 45, or is inserted thereinto from outside. By pushing its end zones upwardly by the pins 48, 49 and 50, and by pushing the intermediate zones downwardly by the pins 52, 53, the data support is deformed in such a manner that, as seen in FIGS. 1 and 3, its lateral edges 3, 4, or a cross-section thereof, will have a generally waved shape throughout the data support and parallel to the side walls 19, 20 engaging for alignment. As soon as a sensor 58 determines that the data support has reached a predetermined position in longitudinal direction above the supporting frame 14, i.e. is sufficiently introduced or pulled into the system, the sensor will deliver a signal to a control device 59 causing the actuating shaft 38 to be rotated in the direction of arrow 41. This will move the pivots 35, 35' downwardly in the front and rear guiding slots 36, 36' and thus move the side walls 19, 20 in the direction of arrows 17, 18 towards the data support 1 until they contact the lateral edges 3, 4 thereof. By bending or deforming the data support out of its plane into a waved shape normally to the direction of the forces of the side walls 19, 20 engaging the data support, this data support will be stabilized against any deformation or damaging, in such a manner that a perfect alignment of the data support may be achieved without damaging the same, particularly its edges.

When the alignment operation is completed, the pressure plate 45 will be moved towards the supporting frame by the control device 59, whereby the data support 1 is pushed towards the supporting frame and thus against the plane coincident with the supporting surface of the supporting frame. This will assure that the data support will be aligned in the supporting surface of the supporting frame 14. Subsequently, characterization and/or identification is performed by means of the sensor 57 of the data detection system or any other data processing system.

In the above disclosed embodiment, the pins 48, 49, 50, 52 and 53 are all biased into the positions mentioned above, so that a paper having relatively reduced dimensional rigidity will always be waved in the manner disclosed when it is pulled in. Alternately, the pins may be supported in such a manner that, upon insertion of the data support, they are in their retracted positions, and only when it is determined that the data support is pulled in, they are moved into the projecting positions shown in FIGS. 1 and 2 by a control 59 and appropriate means which are not shown, to bring the data support into a state having a waved cross-section.

In the above embodiment, the data support is deformed into a shape of waved cross-section. Generally, it may be deformed in a manner to have different cross-sections. The condition is that the sheet-type data support should assume a non-flat shape. For example, the data support may be deformed into a shape having circular or partly circular cross-section. An essential condition is that the data support should be deformed in such a manner that its resiliency will be sufficient to assure that the data support will again take its original flat shape when it is pushed downwardly by the pressure plate 45 after the alignment operation.

In the above disclosed embodiment, the data support is always aligned centrally with respect to line 37, due to the scissors-type arm pairs of equal length. However, in case the centre line of the data support should be laterally shifted from the line 37, as when it is intended to read a track out of the centre of the data support, this will easily be achieved by the scissors-type arms 23, 32 and 25, 34' being of identical length but longer or shorter than the scissors-type arms 24, 33 and 26, 34.

It should be inderstood that the present invention is in no way limited to the above disclosed embodiments and that many modifications and improvements may be brought thereto without departing ffrom the true spirit of the invention.

What is claimed is:

1. A method of aligning a generally flat flexible data support, the steps of deforming the data support into a shape having a generally waved cross section in a plane substantially normal on one main surface of said data support, and thereafter exerting an alignment force on at least one edge of said data support by moving an alignment member in a direction being substantially perpendicular to said plane into engagement with said one edge.

2. An appartatus for aligning a generally flat flexible data support comprising a supporting member for receiving said data support, means acting upon at least one main surface of said data support to deform said data support into a shape having a generally waved cross-section in a plane substantially normal to said data support, moveable alignment means and means for moving said moveable alignment means in a direction substantially perpendicular to said plane to engage at least one edge of said support to align said data support with respect to said supporting member after said data support has been deformed.

3. An apparatus for aligning a generally flat flexible data support comprising a supporting member for receiving said data support, means acting upon at least one main surface of said data support to deform said data support into a shape having a generally waved cross-section in a plane substantially normal to said data support, and a moveable centering member having side elements engaging said data support for alignment thereof by exerting said alignment force substantially perpendicular to said plane, said side elements being substantially parallel to said plane of said waved cross-section of said data support, and means for moving said moveable centering member to cause it to exert said alignment force after said data support has been deformed.

* * * * *